United States Patent [19]

Fulk, Jr.

[11] Patent Number: 4,992,177
[45] Date of Patent: Feb. 12, 1991

[54] TUBULAR FILTRATION MODULE AND SYSTEM WITH FLOW DISTRIBUTOR AND IMPROVED METHOD OF SEPARATION

[75] Inventor: Clyde W. Fulk, Jr., Haverhill, Mass.

[73] Assignee: Koch Membrane Systems, Inc., Wilmington, Mass.

[21] Appl. No.: 419,660

[22] Filed: Oct. 11, 1989

[51] Int. Cl.⁵ ..................... B01D 61/18; B01D 61/20
[52] U.S. Cl. ........................... 210/644; 210/321.6; 210/321.8; 210/321.89; 210/500.23
[58] Field of Search ........ 210/634, 644, 649, 650-652, 210/321.6, 321.61, 321.64, 321.72, 321.78, 321.79, 321.8, 321.87, 321.88, 321.89, 500.21, 500.23, 497.01; 285/371, 383

[56] References Cited

U.S. PATENT DOCUMENTS

| | | | |
|---|---|---|---|
| 3,934,906 | 1/1976 | Shippey et al. | 285/371 |
| 3,992,045 | 11/1976 | Whittell et al. | 285/371 |
| 4,309,287 | 1/1982 | Roos et al. | 210/321.87 |
| 4,461,707 | 7/1984 | Thayer et al. | 210/321.79 |
| 4,707,268 | 11/1987 | Shah et al. | 210/650 |

Primary Examiner—Frank Sever
Attorney, Agent, or Firm—Richard P. Crowley

[57] ABSTRACT

A tubular membrane module system and method which comprise a plurality of UF modules connected in series by U-bends with an end fitting to the modules whose cross sectional flow area is substantially equal to the cross sectional flow area of the U-bends and wherein individual, longitudinal, tapered projections in the end fittings extend in the central flow passageway from the ends of each tube to minimize flow velocity changes of the streams into the central flow channel and into the end of the U-bend by maintaining a substantially constant cross sectional flow area thereby reducing expansion-contraction pressure losses.

12 Claims, 1 Drawing Sheet

TUBULAR FILTRATION MODULE AND SYSTEM WITH FLOW DISTRIBUTOR AND IMPROVED METHOD OF SEPARATION

BACKGROUND OF THE INVENTION

Multitubular membrane modules wherein a plurality of membrane tubes, e.g. 3 to 20, are disposed in a module housing are used to filter feed streams where a high membrane packing density is desirable. In order to keep the volumetric flow rate low, the membrane modules are connected in series wherein the concentrate stream from the first module is the feed stream for the next succeeding membrane module and so forth. The number of membrane modules connected in series may vary; however, the number is limited by the pressure drop through the membrane modules and their connecting fittings. Ultrafiltration membrane module systems employing a number of modules in series are used for the separation of solid-containing feed streams, such as, but not limited to: aqueous electrocoat paint streams; oil in water emulsions; aqueous polyvinyl alcohol; industrial waste streams; dairy streams; and fruit juice streams.

Generally, a tubular membrane system has an even number of membrane modules to reduce piping with the tubes connected in series with U-bend fittings at each end, except the initial feed inlet and final concentrate outlet. The feed inlet and concentrate outlet are usually on the same side to reduce piping and place the pumps close to the inlet and outlet. The membrane tubes include an outer cylindrical housing and a plurality of tubes having a thin membrane on the inside with the membrane tubes inserted in a closely packed manner into the housing. The membrane tubes may be positioned in the housing in a defined manner and number optionally employing a tube locator which is inserted into or on the end of each membrane tube in the module. The tubes have a potting resin injected at each tube end in the space between the closely bundled tubes and the housing as shown for example in U.S. Pat. No. 4,707,261, issued Nov. 17, 1987.

Multiple membrane tubular modules include a housing with a plurality of membrane tubes, the space between each individual membrane tube at each end potted with a potting resin to the end of the membrane tube with one open end of each individual membrane tube discharging a concentrate stream from the module and the other open end of the tubes receiving the concentrate stream from a previous module as a feed stream. The ends of the membrane tubes in each module have short end fittings which collect the flow from the individual membrane tubes and direct the flow into one end of the U-bend tube. The other end of the U-bend tube also has an end fitting which then directs the concentrate stream flow from the previous module into the individual membrane tubes of the next module as a feed stream.

Typically, the end fittings fit and are sealed in a fluid tight manner within the end of the module housing while the other end of the fitting is threaded with an outer nut which retains one end of a U-bend against a sealing washer or "O" ring within the end fitting for a fluid tight connection to one end of the U-bend. The other end of the U-bend is connected similarly in a fluid tight, threaded sealed connection with another end fitting. A trumpet-type or conical opening of the one end of the end fitting is positioned directly against and adjacent the resin potted ends of the individual tubes to receive the fluid flow from or direct the fluid flow to the individual membrane tubes in the module.

In such prior art tubular membrane modules, there is a pressure drop in the fluid between the end of the tubes which discharges the concentrate into the end fitting and connecting U-bend and into the end of the next tubes which receive the concentrate as the feed stream. Between the respective ends of the membrane tubes is a cross sectional area change and an irretrievable loss of fluid total energy due to changes in kinetic energy. Membrane module systems employ at present a trumpet-shaped or conical end fitting adjacent the ends of the membrane tubes of the membrane modules to collect the flow of one stream from the tube ends and to direct the stream into the next succeeding membrane module through the connecting U-bend. The end fitting has the wide flared trumpet end of the fitting positioned toward and in position to collect the total flow of the concentrate streams from the tube ends with the reverse for the introduction of the concentrate stream as the feed stream. The fluid discharged into the open trumpet end of the tube accelerates in flow and causes an entrance pressure loss effect, i.e. a contraction loss. When the fluid is discharged from the trumpet end of the tube and into the feed inlet, there is an expansion pressure loss effect, i.e. expansion loss. The problems associated with contraction-expansion losses in membrane modules are well recongnized and known.

It is desirable to increase the number of membrane modules that may be employed in any membrane system and to improve the separation efficiency of the system. It is also desirable to reduce the hydrodynamic pressure drop associated with each membrane module and to increase crossflow velocity since reduced pressure drop improves energy efficiency and increased flow velocity results in increased filtration rates.

SUMMARY OF THE INVENTION

The invention relates to a membrane module system, to membrane modules and end fittings used in the system, and to an improved method of ultrafiltration. The invention is equally applicable to all cross flow filtration processes including tubular membranes.

The invention relates to an improved ultrafiltration membrane module system and method for the separation of a feed stream into a concentrate stream and a permeate stream. The membrane module system and method comprise a plurality of membrane modules connected in series and wherein each membrane module comprises a tubular module housing and a plurality of membrane tubes within the housing, the membrane tubes having a membrane therein for the ultrafiltration and separation of a feed stream introduced into the one end of the tube into a concentrate stream taken from the other end of the stream and a permeate stream. The membrane module system includes a flow connecting means to connect the one end of each module housing to the end of the next succeeding housing in the system whereby the concentrate stream collected from all of the membrane tubes of one module is flow connected and becomes the feed stream of the membrane tubes in the next succeeding module in the system. Generally, the flow connecting means would comprise a connecting U-bend tube with a pair of end fittings at the end of each module and connected to each end of the connecting U-bend tubes. The membrane module system would include means to withdraw a total permeate stream from each module and a means to withdraw a concentrate stream from the last module in the system and means to introduce a feed stream into the first module of the system.

The improvement of the membrane module system comprises a flow transition means to minimize the changes in the flow velocity of the concentrate stream taken from the end of each of the membrane tube's inner module for the feed stream introduced into the ends of the membrane tubes of succeeding modules by maintaining a substantially constant cross sectional flow area between the ends of the individual membrane tubes and the central flow passage of the connecting means. The transition means comprises a plurality of elongated, tapered, truncated, conical projection elements to form projection passageways extending from the ends of the individual membrane tubes into the flow connecting means, and thereby reducing the expansion-contraction loss between the individual membrane modules in the systems and also thereby permitting a reduction in pressure properties between individual modules so that the greater number of modules may be employed in the membrane system.

The flow transmission means of the invention thus comprises a plurality of individual, elongated, generally tapered, conical projections which form conical, tapered passageways extending from the ends of the individual membrane tubes and into the central flow passage of the connecting means so as for example where a concentrate stream is discharged from the ends of the membrane tubes of a module, the outwardly tapered passageways permit the gradual flow, that is expansion, of the concentrate flow into the central flow passage of the end fitting and subsequently the tubular U-bend so as to reduce any expansion loss. Similarly, the concentrate stream in the U-bend which now becomes the feed stream for the next succeeding membrane module is gradually contracted by the elongated, truncated, individual passageways extending from the central flow passageway into the ends of the individual membrane tubes in the next succeeding modules to reduce the contraction loss.

The transition flow means of the invention will be described for the purposes of illustration only in connection with a specific embodiment wherein a molded end fitting is employed and the elongated flow passageway is made a part of the end fitting. However, it is recognized that such elongated, conical, truncated, tapered passageways extending from the individual ends of the individual membrane tubes from each module can also be formed by extending for example the ends of the tube locators to form such elongated passageways or employing separately individual, formed plastic elements extending into the end of each individual membrane tube for the same purposes. However, it has been discovered that such elongated passageways may be an integral molded part of the end fitting which connects the end of the individual modules through the tubular U-bend.

The flow transition end fitting is used for connecting one end of a tubular membrane module to a tubular U-bend which is connected also through an other end fitting to the one end of another membrane module. The end fitting at the one end having means to secure the one end to the one end of the U-bend, such as an extended threaded surface which threadably mates with a U-bend end fitting and of the other end to fit slidably and snugly in a fluid tight manner within the cylinder housing. The end fitting has a central flow passageway with a circular, cross sectional flow area at the one end. The other end of the end fitting has a plurality of defined, circular openings in the end face and a solid face surface therebetween designed for example, optionally slightly concave, to fit snugly against the potted membrane tube face surface at the one end of the membrane module and to have the openings to be axially aligned with the ends of the membrane tubes in the housing. Each of the tube openings in the end fitting have tapered side wall projections extending inwardly a minor distance into the central flow passageway of the end fitting with the thin outer edge of the projections having a plurality of symmetrical, inverted V-type fingers.

The transition flow means generally has an individual, elongated, tapered, controlled flow passageways wherein the cross sectional flow area of the transition passageway is substantially equal to for example ten percent or less of the sum of the cross sectional area flow passage of the individual membrane tubes within the membrane modules. The transition flow path is generally characterized by generally smooth interior and exterior surfaces with the base of the truncated cone vertically about and flush and adjacent with the ends of the individual membrane tubes. The conical passageways of the transition means should gradually taper for example from about 5° to 20° into the cylindrical, generally smooth interior central flow passageways within the end fittings and hence into the cross sectional flow into the central flow passageway of the connected tubular U-bend. It is desirable to maintain a substantially constant cross sectional flow passageway for at least a portion of the way into the central flow passageway of the end fitting. For example, any conical projection should extend from one face adjacent the ends of the individual membrane tubes up to about 20% to 50% of the axial length of the end fitting and into the central flow passageway of the end fitting. The tapered projections and tapered flow passageways form a plurality of spike or inverted V-shaped projections and extend to a very thin end of the projections. The projections extend and fill the space in the cross sectional flow area of the end fitting so as to reduce irreversible changes in the kinetic energy, that is, to reduce the contraction-expansion losses between the ends of the individual membrane tubes in each of the modules. With the flow transition means of the invention, the only pressure loss due to the tapered projection is loss relating to the frictional drag of the stream on the opening projection surface, which pressure loss is generally considerably less than the pressure loss due to the expansion and contraction by the change in flow velocity.

The employment of the designed end fitting reduces the pressure drop of the membrane module in comparison to the conventional design for example in the pressure drop per module ranges of from 4 to 10 psi differential, or a reduction of 5% to 15% or more over conventional module designs without the tapered end fittings and the pressure does not exceed 20 psi differential. The reduction or pressure drop permits more membrane modules to be connected in series and the cross flow velocity of each module increased.

The invention permits an improved method for the separation of high solid-containing feed streams by reducing or minimizing pressure losses associated with the changes in the flow velocity and cross sectional flow area of the concentrate stream as it moves from the end of the tubes and through the module end fitting to the next succeeding module.

The invention will be described for the purposes of illustration only in connection with certain embodiments to be described; however, it is recognized that those persons skilled in the art may make various changes, additions, modifications and improvements in the illustrated embodiments, all falling within the spirit and scope of the invention.

DESCRIPTION OF THE EMBODIMENTS

Figure 1:
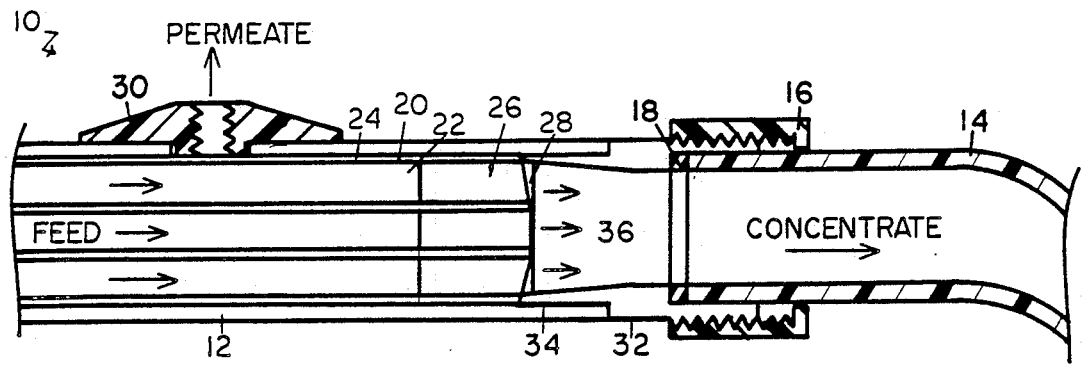
FIG. 1 is a fragmentary, enlarged, sectional view of a prior art multiple tube membrane module connected through an end fitting to a U-bend.

FIG. 1 is fragmentary, enlarged, sectional view of a prior art multiple tube membrane module and having a cylindrical module housing 12 and containing a plurality, such as 5 to 7, membrane tubes therein 20 having an ultrafiltration membrane 22 secured to the internal surface thereof. The membrane tubes 20 group together within the housing 12 and have a flow space 24 between the individual tubes so that permeate passing through the membrane 22 may be removed from the permeate outlet 30. At the end of the membrane tubes 20, there is a plastic tube locator 26 with tubular fingers fitting within the ends of the membrane tubes 20 and a potting resin 28 employed about the ends to seal the membrane tubes and the locator in position. The module as shown includes an end fitting 32 having a central flow passage which at one end as illustrated is an open, trumpet-type flow passage 36 to receive the flow from the ends of the individual tubes 20, while at the other end of the fitting, the flow passage is a central, circular flow passage. The end fitting 32 has a shoulder 34 which fits within and is sealed to the interior surface of the end of the tubular housing 12. The other end of the end fitting 32 is threaded and one end of a tubular U-bend 14 is inserted within the end of the fitting 32 and with the use of a neoprene or rubber-type washer 18 and a threadable nut 16, the end of the tubular U-bend is sealed within the other end of the end fitting 32.

In the embodiment illustrated in FIG. 1, the feed stream is introduced at the one end of the module 10 and flows to the individual tubes 20 and through the ultrafiltration membrane 22 and a permeate stream is removed from the space 24 between the individual tubes 20 and removed through the permeate outlet 30. The concentrated feed stream is withdrawn from the end of the membrane tubes 20 and is then discharged into the trumpet end 36 of the flow passageway of the end fitting 32 and the flow contracted in the central flow passage of the end fitting 32 and hence through the flow passage of the tubular U-bend 14. The concentrate stream so removed is then introduced by the U-bend as the feed stream in a succeeding membrane module (not shown). The employment of the trumpet-type end fitting 32 causes an irreversible expansion-contraction loss and also a contraction-expansion loss when the concentrate stream is then introduced as the feed stream into the next succeeding module wherein the same type of trumpet-type end fitting 32 is employed.

Figure 2:
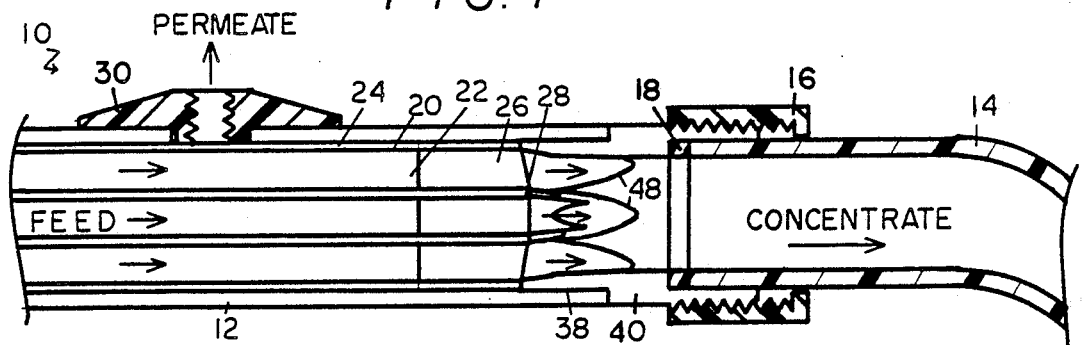
FIG. 2 is a fragmentary, enlarged, sectional view of the multiple tube membrane module connected through a flow transition end fitting of the invention to a U-bend.
Figure 3:
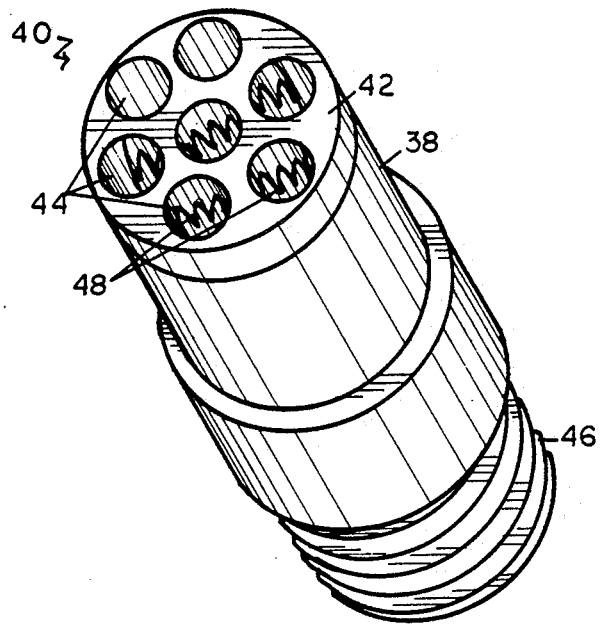
FIG. 3 is a perspective view of the end flow transition fitting shown in FIG. 2.

FIG. 2 is directed to a interior, enlarged, sectional view of a multiple tube membrane module employing a flow transition end fitting of the invention 40 having a shoulder 38 which fits in a similar manner within the end of the tubular module housing 12. The transition flow end fitting 40 is also shown in its perspective form in FIG. 3 in that the one end is a solid end fitting face 42 formed of a plastic and a plurality of end fitting flow passageways 44. Each passageway as illustrated more particularly in FIG. 2 is aligned with and is designed to be axially aligned with the ends of the membrane tubes 20, the end fitting face 42 is slightly vertically tapered to fit in a snug, fluid tapered manner against the ends of the tube locator 26 and the potting resin 28 and has a threaded end 46 designed as in the prior art to receive the end of the U-bend 14 and to be sealed by the nut 16.

The flow transition end fitting 40 is characterized by a plurality of tapered flow passages formed by multiple projections 48 which taper down to a generally V-shaped end edge projections which extend into the central flow passage of the end fitting 40. The tapered flow passages taper longitudinally inwardly, that is, contract the flow at a longitudinal and axial angle of about 5° to 12° and extend generally about 20% to 30% into the end fitting from the one face end of the end fitting 40 which abuts the ends of the membrane tubes 20. The transition flow end fitting 40 employing the tapered, elongated flow passages provide a substantially constant cross sectional flow area during the transition of the flow of the concentrate stream from the end of the membrane tubes 20 into the central flow passageway of the end fitting 40 so as to minimize flow velocity changes. The concentrate stream of each tube enters the end of the central flow passage of the end fitting and subsequently the U-bend. Such gradual reduction reduces the pressure drop of each module with the modules employed in series and thereby permitting more membrane modules to be used in series and minimizes the irreversible contraction-expansion losses associated with the prior art in fittings in membrane modules.

While the invention has been described for the purposes of illustration in connection with ultrafiltration modules, the invention is applicable to all multiple tube membrane-filtration type operations and apparatus where problems associated with contraction-expansion losses are present to include but not be limited to high pressure, reverse osmosis and microfiltration.

What is claimed is:

1. In a membrane module system for the separation of a feed stream into a concentrate stream and a permeate stream and which module system comprises:
   (a) a plurality of membrane modules connected in series and each module comprising:
      (i) a tubular module housing;
      (ii) a plurality of membrane tubes within the housing, the membrane tubes having a membrane for the separation of a fluid and having a one and other end; and
   (b) a flow connecting means having a central flow passage and having a one and other end to connect the one end of each module's housing to the end of the next succeeding housing in the module system whereby the concentrate stream collected from the individual membrane tubes of one module is collected and forms the feed stream of the individual membrane tubes in the next succeeding module;

(c) means to withdraw a total permeate stream from each module;
(d) means to withdraw a concentrate stream from the last module in the module system; and
(e) a means to introduce a feed stream into the first module of the module system, the improvement which comprises:
flow transmission means to minimize the changes in flow velocity of the streams from or into the individual membrane tubes of each module in the system by maintaining a substantially constant cross flow area between the ends of the individual membrane tubes of the module and the central passageway of the flow connecting means, the transition means comprising and including a plurality of elongated, truncated, conical projection elements extending from the ends of the membrane tubes to define a plurality of generally slightly tapered, truncated, conical flow passageways which extend from the end of the membrane tubes toward the central flow passages of the flow connecting means for reducing the expansion-contraction loss between the membrane modules in the system.

2. The system of claim 1 wherein the projecting elements have a tapered surface extending from about 5° to 25° from the longitudinal axis of the projection elements.

3. The system of claim 1 wherein the connecting means comprises a tubular U-bend having a central flow passage and a pair of end fittings, each of the end fittings having a central flow passage to one end thereof, and containing at the other end thereof a plurality of individual tapered flow passageways extending from the ends of the membrane tubes and gradually into the central flow passage of the end fittings.

4. The system of claim 3 wherein the elongated projection elements and the elongated flow passages formed by such projection elements extend about 20% to 50% of the longitudinal length of the length of the end fitting.

5. The system of claim 1 wherein the elongated projection elements form at the one tapered end thereof a plurality of generally thin, V-shaped peripheral edges.

6. A membrane module end fitting for connecting one or the other end of a multiple tube membrane module and which comprises a plurality of membrane tubes in a tubular housing to one end of a tubular U-bend element having a central flow passageway and which tubular U-bend element connects the other end through another end fitting to another end membrane module and which end fitting comprises:
(a) a plastic molded end fitting having a one and an other end, the one end having a solid face end and a plurality of individual flow passages therein, the face end adapted to be connected in a fluid tight relationship with the one or other end of the membrane tubes in the membrane module and with the individual flow passages designed to be axially aligned with the face of the individual membrane tubes of the membrane module;
(b) the end fitting having a plurality of elongated, generally truncated, conical individual flow passages extending from the flow passages at the one end toward the other end of the end fitting; and
(c) the end fitting having a central flow passage extending from the other end and toward the one end whereby the truncated flow passages gradually taper into central flow passage of the end fitting as the stream between the one and other end of the end fitting for providing for maintenance of a substantially constant cross sectional flow area between the central flow passage of the end fitting and the total cross sectional flow area of the sum of the individual membrane tubes of the membrane module.

7. A membrane module having the one and the other end and having the end fitting of claim 6 secured at the one or other or both ends.

8. In a method for the separation of a feed stream into a concentrate stream and a permeate stream, which method comprises:
introducing a feed stream into a multiple tube membrane module, withdrawing a concentrate stream from the membrane module at the other end of the module and introducing the withdrawn concentrate stream into a central flow passage and thereafter introducing the withdrawn concentrate stream as the feed stream into the next succeeding membrane module in series and continuing such flow sequence until a concentrate stream of desired concentration is obtained, the improvement which comprises:
(i) providing a flow transmission means between the ends of the individual membrane tubes of each module and the central flow passageway so as to maintain a substantially constant cross sectional flow area between the cross sectional flow area in sum of the ends of the membrane tube and the central flow passageway during the transition of the flow of the concentrate stream from the end of the individual membrane tubes and into the central flow passageway so as to minimize flow velocity changes and to reduce the expansion and contraction losses associated with such flow velocity changes for permitting reduction in pressure drop of each membrane module in the membrane system and permitting more membrane modules to be used in series to obtain the desired concentrate stream.

9. The method of claim 8 wherein the transmission means includes a plurality of individual, longitudinally extending, elongated passageways extending from the ends of the individual membrane tubes and toward and into the central flow passageways to maintain a substantially constant cross sectional flow area.

10. The method of claim 8 which includes gradually tapering the elongated flow passageways of the transitional means from about 5° to 25° from the longitudinal axis.

11. The method of claim 8 which includes extending the elongated passageways by a plurality of projections, the projections having a thin, tapered, generally V-shaped end extending into the central flow passageway.

12. A molded end fitting which comprises: means for use with an ultrafiltration membrane module system to connect the ends of a multiple tube membrane module with one end of a U-bend connector and through another molded end fitting at the other end of the U-bend connector to a subsequent multiple tube membrane module which end fitting further comprises:
(a) a plastic molded fitting having a one end adapted to fit in a fluid tight manner within the end of the membrane module and another end adapted to be threadably secured in a fluid tight manner to the one end of the U-bend connector and having a central flow passageway extending from the other end a major distance toward the one end;

(b) the one end having a face surface formed to fit in a snug manner against the face surface of the end of the membrane tubes in the membrane modules and having a plurality of circular flow passageways in the face surface for axial alignment with the ends of the membrane tubes in the membrane module; and (c) a plurality of axially inwardly, tapered, extended, molded projections extending from each of the circular passageways into the central flow passageway of the end fitting, the projections tapered so as to maintain a substantially constant cross sectional flow area between the flow area of the ends of the membrane tubes and the flow area of the central flow passageway for reducing expansion and contraction losses.

* * * * *